March 11, 1969 E. M. INGMAN 3,432,763

AMPLIFIER EMPLOYING NONLINEAR DC NEGATIVE FEEDBACK TO STABILIZE ITS DC OPERATING POINT

Filed Dec. 13, 1966

INVENTOR
ERIC M. INGMAN
BY Roland I. Griffin
ATTORNEY 3,432,763

AMPLIFIER EMPLOYING NONLINEAR DC NEGATIVE FEEDBACK TO STABILIZE ITS DC OPERATING POINT

Eric M. Ingman, Palo Alto, Calif., assignor to Hewlett-Packard Company, Palo Alto, Calif., a corporation of California Filed Dec. 13, 1966, Ser. No. 601,523
U.S. Cl. 330—25
Int. Cl. H03g 3/30
2 Claims

ABSTRACT OF THE DISCLOSURE

A first DC coupled amplifier having a non-linear DC negative feedback circuit that includes a second DC coupled amplifier for amplifying feedback pulses supplied to the feedback circuit from the output of the first amplifier, a clipping circuit for clipping the amplified feedback pulses at a selected level corresponding to the desired baseline of the output pulses from the first amplifier and hence to the desired DC operating point of the amplifier, and a low pass RC filter for integrating the clipped, amplified feedback pulses to obtain a DC signal that biases the first amplifier to substantially the desired DC operating point.

*Summary of the invention*

It is the principal object of this invention to reduce the change in the DC operating point of a DC coupled amplifier when the input pulse height, width, or repetition rate is changed.

This object is accomplished in accordance with the illustrated embodiment of this invention by providing the DC coupled amplifier with a nonlinear DC negative feedback circuit for amplifying feedback pulses supplied to the feedback circuit from the amplifier, uniformly clipping each amplified feedback pulse at a selected level corresponding substantially to the desired baseline of the output pulses from the amplifier and hence to the desired DC operating point of the amplifier, and then integrating the clipped, amplified feedback pulses to obtain a DC signal that determines the DC operating point of the amplifier.

*Description of the preferred embodiment*

Figure 1:
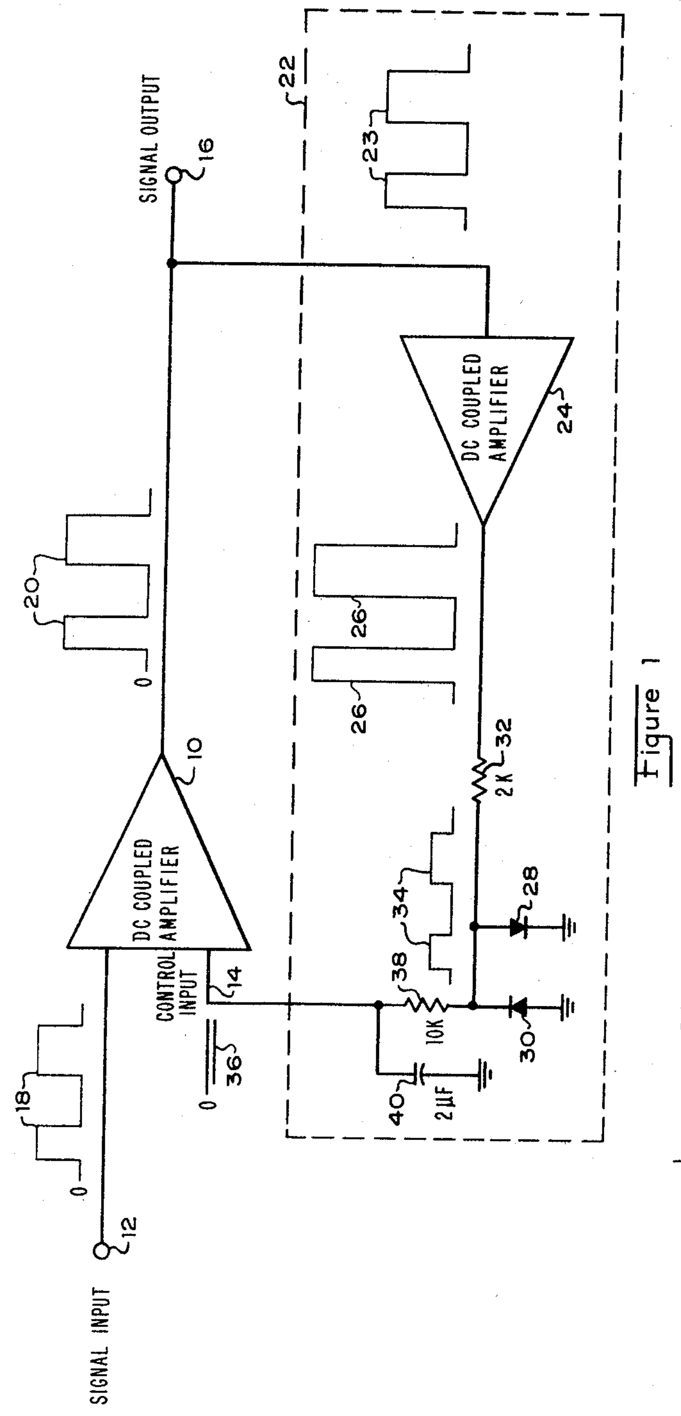
FIGURE 1 is a schematic diagram of the preferred embodiment of this invention.

Referring to FIGURE 1, there is shown a DC coupled amplifier 10 having a differential input, which comprises a signal input 12 and a control input 14, and having a signal output 16. Input pulses 18 applied to the signal input 12 are amplified by the amplifier 10 and supplied as output pulses 20 to the signal output 16. A nonlinear DC negative feedback circuit 22 is connected between the signal output 16 and the control input 14 of the amplifier 10 and is responsive to feedback pulses 23 from the signal output 16 for controlling the DC operating point of the amplifier 10. This feedback circuit 22 may include a DC coupled amplifier 24 connected to the signal output 16 for amplifying the feedback pulses 23. A clipping circuit is connected to the output of the amplifier 24 for uniformly clipping amplified feedback pulses 26 of either polarity at a selected low level corresponding substantially to the desired baseline (for example, zero volts) of the output pulses 20 and hence to the desired DC operating point of the amplifier 10. This clipping circuit comprises two oppositely poled diodes 28 and 30 connected in parallel between the output of the amplifier 24 and ground. A resistor 32 is serially connected between the output of the amplifier 24 and the clipping circuit to prevent the clipping circuit from overloading the amplifier 24. A low pass RC filter circuit is connected between the clipping circuit and the control input 14 for integrating the clipped, amplified feedback pulses 34 so as to supply a DC signal 36 to the control input 14. This DC signal 36 determines the DC operating point of the amplifier 10. The low pass RC filter circuit comprises a resistor 38 connected between the clipping circuit and the control input 14 of the amplifier 10 and connected in series with the resistor 32; it also comprises a capacitor 40 connected to ground from a point between the control input 14 and the resistor 38.

Figure 2:
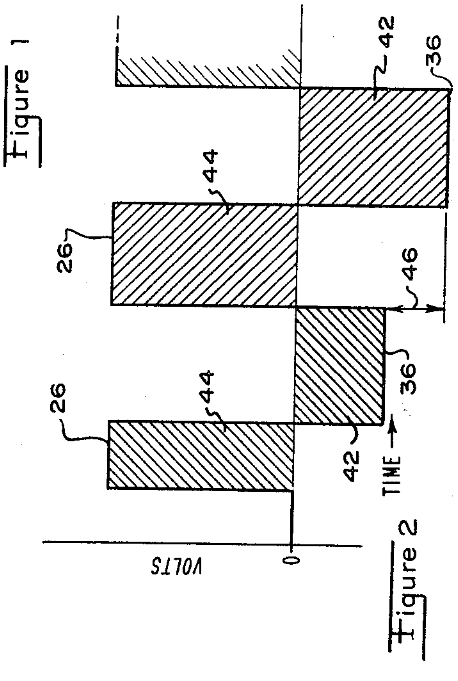
FIGURES 2 and 3 are exaggerated waveform diagrams illustrating the operation of the nonlinear DC negative feedback circuit of FIGURE 1.
Figure 3:
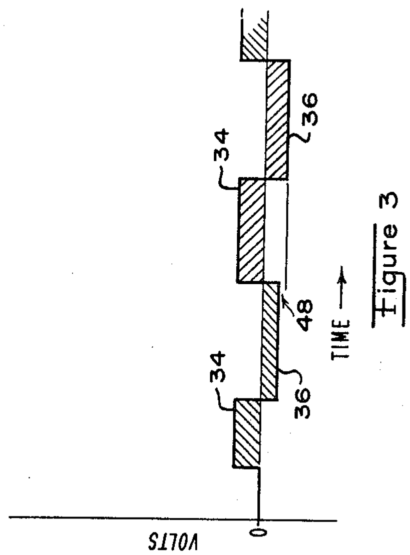

If the amplified feedback pulses 26 were integrated without first uniformly clipping them at a selected low level, the level of the DC signal 36 supplied to the control input 14 and hence the DC operating point of the amplifier 10 would differ greatly from the desired baseline (zero volts) of the output pulses 20 and would shift radically with changes in the input pulse height, width, or repetition rate. This is illustrated in FIGURE 2 where successive amplified feedback pulses 26 of different width produced in response to a change in the width of the input pulses 18 are shown. Integration of each of these amplified feedback pulses 26 provides a DC signal 36 such that the shaded area 42 beneath the DC signal 36 approximately equals the similarly shaded area 44 of the entire corresponding amplified feedback pulse 26. Thus, the level of the DC signals 36 differs greatly from the desired baseline (zero volts) of the output pulses 20 and, as indicated at 46, shifts radically with the change in the input pulse width. The level of the DC signals 36 and hence the DC operating point of the amplifier 10 are stabilized about the desired baseline (zero volts) of the output pulses 20 by uniformly clipping the amplified feedback pulses 26 at a selected low level corresponding substantially to the desired baseline of the output pulses. This is illustrated in FIGURE 3 where the successive amplified feedback pulses 26 of FIGURE 2 are shown after they have been clipped at the selected low level. The level of the DC signals 36 produced by integration of the clipped, amplified feedback pulses 34 does not differ substantially from the desired baseline (zero volts) of the output pulses 20 and does not shift substantially with the change in input pulse width because of the small area of the clipped, amplified feedback pulses 34. Thus, by clipping the amplified feedback pulses 26 prior to integration the DC operating point of the amplifier 10 may be substantially stabilized for changes in pulse width or repetition rate and completely stabilized for changes in pulse height. The clipping level is limited only by the low frequency noise level and oscillation resulting from too much low frequency feedback. Although the level of the DC signals 36 and hence the DC operating point of the amplifier 10 may be stabilized by clipping the feedback pulses 23 directly, better stabilization is achieved by first amplifying the feedback pulses 23 so that they may be clipped at a correspondingly lower level. The greater the amplification of the feedback pulses 23 the more closely they may be clipped to a level corresponding to the desired baseline (zero volts) of the output pulses 20.

What is claimed is:

1. A DC-coupled amplifying circuit having an input including a terminal for receiving input pulses to be amplified, an output for transmitting the amplified input pulses, and a nonlinear DC negative feedback circuit connected between the output and the input of said amplifying circuit, wherein the improvement comprises:

an amplifier connected in said feedback circuit to the output of said amplifying circuit to amplify feedback pulses from the output of said amplifying circuit;

a bipolar clipping circuit connected in said feedback circuit between said amplifier and the input of said amplifying circuit to clip amplified feedback pulses of either polarity from said amplifier at a selected level corresponding substantially to the desired DC baseline of the amplified input pulses and hence to the desired DC operating point of said amplifying circuit; and a low pass filter connected in said feedback circuit between said bipolar clipping circuit and the input of said amplifying circuit to integrate clipped, amplified feedback pulses of either polarity and supply a DC signal for biasing said amplifying circuit substantially to the desired DC operating point.

2. A DC-coupled amplifying circuit as in claim 1 wherein:

said bipolar clipping circuit comprises a first diode connected from a point between said amplifier and said low pass filter to a point of reference potential and includes a second diode connected from the same point between said amplifier and said low pass filter to said point of reference potential, said first and second diodes being oppositely poled relative to said point of reference potential; and said low pass filter comprises a resistor serially connected in said feedback circuit between said bipolar clipping circuit and the input of said amplifying circuit and comprises a capacitor connected from a point between the input of said amplifying circuit and said resistor to a point of reference potential.

References Cited

UNITED STATES PATENTS

| | | | |
|---|---|---|---|
| 2,299,945 | 10/1942 | Wendt | 178—7.3 |
| 2,507,695 | 5/1950 | Dean | 330—135 |
| 2,844,647 | 7/1958 | Hurford | 330—11 X |
| 2,851,520 | 9/1958 | Polonsky et al. | 330—11 X |
| 3,328,590 | 6/1967 | Kapsambelis | 330—29 X |

ROY LAKE, *Primary Examiner.*

JAMES B. MULLINS, *Assistant Examiner.*

U.S. Cl. X.R.

330—85, 110, 135, 140